Figure 1:
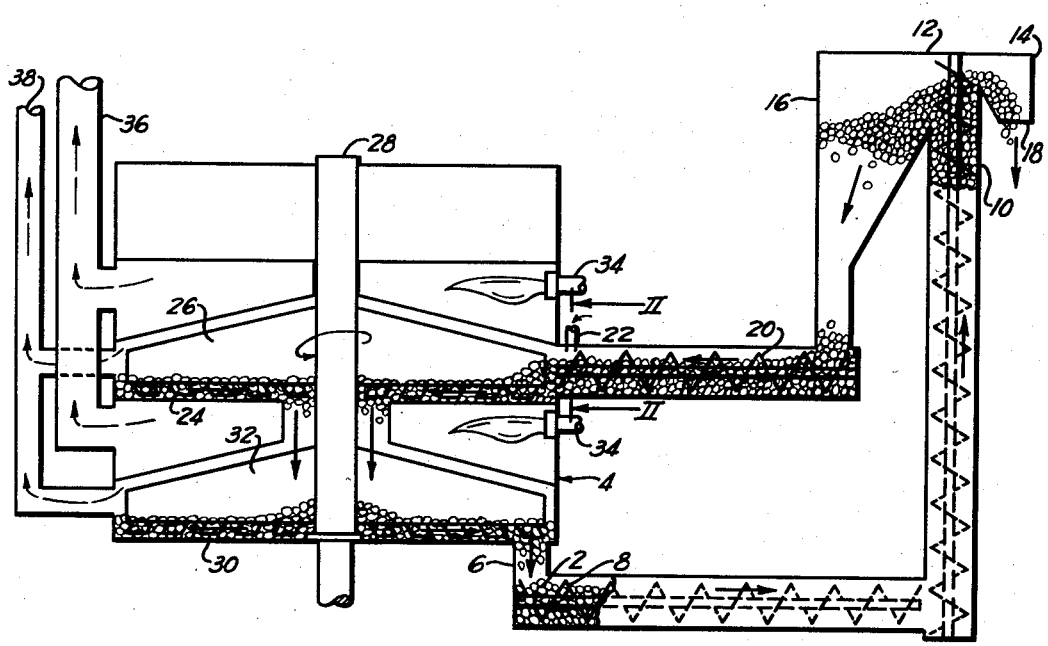

July 14, 1959 A. E. CATANACH 2,894,819
METHOD FOR DECOMPOSING SULFURIC ACID SLUDGE
Filed April 30, 1956

INVENTOR.
ARTHUR E. CATANACH
BY
HIS ATTORNEY

United States Patent Office 2,894,819
Patented July 14, 1959

2,894,819

METHOD FOR DECOMPOSING SULFURIC ACID SLUDGE

Arthur E. Catanach, Groves, Tex., assignor to Gulf Oil Corporation, Pittsburgh, Pa., a corporation of Delaware Application April 30, 1956, Serial No. 581,623

9 Claims. (Cl. 23—177)

This invention relates to an improved method for recovering valuable products from sulfuric acid sludges, more particularly a method for recovering valuable products such as sulfur dioxide and a carbonaceous material commonly referred to as "coke" from sulfuric acid sludges resulting from the refining of petroleum products.

Sulfuric acid is employed widely and in large amounts in the conventional refining of petroleum hydrocarbons. As a result of such treatment acid sludges consisting essentially of sulfuric acid, sulfonates and hydrocarbon material are formed. Examples of sulfuric acid sludges produced in the petroleum industry as a result of refining petroleum are spent alkylation acids, sludge from pressure still distillate treatment, sludge from lube oil treatment, sludge from wax treatment, sludge from treatment of kerosene, etc. Since the amount of sulfuric acid sludge produced in the petroluem industry is large, and a major portion thereof consists of sulfuric acid, it is apparent that the recovery of sulfuric acid values therefrom is of great importance.

In the past, sulfuric acid values from sulfuric acid sludge have been recovered by heating the sludge to a temperature in excess of about 500° F. for a time sufficient to decompose the same into gaseous products comprising sulfur dioxide, water and hydrocarbon vapors and a carbonaceous material commonly known as "coke." The heat required to maintain decomposition temperatures has been obtained in many ways. In the present case, for example, heat is obtained in two ways. First, heat is supplied for decomposition of the sulfuric acid sludge by burners maintained in indirect heat exchange relationship with the sludge within the decomposition zone. Second, a large amount of the coke which is formed in the decomposition zone is withdrawn therefrom at an elevated temperature, which can be about 400° to about 500° F., and recycled to the decomposition zone to supply additional heat.

The hot coke which is recycled is not reintroduced into the decomposition zone as such but is passed therein along with the sulfuric acid sludge to be decomposed. The sulfuric acid sludge is generally in the form of a liquid, while the coke is particulate carbonaceous material. Unfortunately when the hot coke and sludge are thoroughly mixed before entering the decomposition zone, for example, in a conveyor with forward and reversing paddles (but in some cases a screw conveyor) large balls of gummy material are formed and/or a heavy deposit is built up on the paddles or screw, plugging the conveyor. Other methods of combining the sludge and coke result in formation of lumps in the decomposition zone or kiln, where they must be broken up to keep the decomposition zone from being clogged. This requires the use of additional equipment in the decomposition zone and further complicates the decomposition process. In addition, since the recycled coke is hot, a small amount of decomposition of the sludge occurs in the feed screw conveyor when contact is made between the coke and sludge. The gas resulting from the decomposition, comprising sulfur dioxide, hydrocarbon vapors, water vapor, etc., is wet and wets the surfaces of the screw conveyor as well as the walls of the chamber in which it is located. Further wetting of the surface of the conveyor and the walls of the chamber can occur from splashing of the sludge when introduced into the chamber. The recycled coke is in particulate form and will deposit on the wet surfaces and walls. In a short time these deposits will build up and clog the screw conveyor.

I have found that the above difficulties can be avoided and acid values can be recovered from sulfuric acid sludge by a process which comprises coating hot coked material with sulfuric acid sludge, passing said coated hot coked material to a decomposition zone in less than about one minute, maintaining the temperature in said decomposition zone sufficiently high to substantially coke the major portion of the hydrocarbon material in said sludge and obtain gaseous decomposition products, removing said gaseous decomposition products from said decomposition zone, removing coked material from said decomposition zone, and recycling a portion of said latter coked material to constitute the hot coked material coated with the sulfuric acid sludge.

Operation in accordance with the present invention avoids the formation of large balls of material consisting of coke and sludge and build-ups of such material on paddles or screws, thus eliminating clogging of the charge screw conveyor or kiln or both. Since the recycled coke is coated with the sludge and the coated coke is passed into the decomposition zone in less than one minute, mixing of the two is minimized and large balls do not result. The coating of sludge will, in a large part, decompose the deposit carbonaceous material on the recycle coke making its size slightly larger. Maintaining a relatively short contact time between the coke and the sludge coating thereon will also reduce to a minimum decomposition of the acid sludge before entering the decomposition zone. In this way the surfaces of the screw conveyor and the walls of the chamber will not be wet with the wet gases which ordinarily would form from the decomposition of the sludge. In order to avoid splashing of the sludge in the charge conveyor, the sludge inlet is positioned as near as possible to the surface of the coke material moving therein and is offset from the longitudinal axis of the screw conveyor so that the coated coke particles in moving through the conveyor to the entrance of the decomposition zone are initially moved under the conveyor rather than over the same.

Any sulfuric acid sludge can be subjected to the method of the present invention with good results providing the carbon content of the sludge is high enough to maintain sufficient coke for recycle. Spent alkylation acid of about 5 percent total carbon content cannot be charged by itself for this reason but must be mixed with a higher carbon content acid sludge. As examples of sulfuric acid sludges which can be employed can be mentioned spent alkylation acids, sludge from pressure still distillate treatment, sludge from lube oil treatment, sludge from wax treatment, sludge from treatment of kerosene, etc., or mixtures thereof. The temperature of the sulfuric acid sludge is not critical, though it should be high enough to permit it to be pumped but not so high as to obtain any appreciable decomposition thereof. In general, the sludge to be treated should be at a temperature of about 60° to about 130° F. While, as noted, any conventional sulfuric acid sludge can be treated in the process of this invention, best results are obtained when the sludge comprises about 35 to about 85 percent by weight of sulfuric acid, a carbon content of about 10 to about 50 percent by weight, and about 0 to about 15 percent by weight of water.

The average particle size of the recycled coke is generally below about ⅜ inch in diameter, preferably between about 1/16 and ¼ inch in diameter. The temperature of the coke leaving the decomposition zone can be about 400° to about 500° F., but is preferably about 420° to about 460° F. If the temperature of the recycled coke were permitted to drop below about 400° F., the coke would contain some free acid and some undecomposed sludge. At temperatures in excess of about 500° F. throughput is markedly reduced, a tendency toward coking up in large particles in the charging conveyor would result, and some of the coke would be liable to powder. The amount of coke which must be recycled to obtain good results is about 15 to about 30, preferably about 20 to about 25, parts by weight of coke per part of sludge. Within these ranges, the amount of sludge is sufficient to coat or substantially coat a large proportion of the coke particles.

As noted, the time elapse between the coating of the coke with the sludge and the entry of the coated coke into the decomposition zone is critical. It must be sufficiently short to avoid formation of gummy balls and appreciable decomposition of the sludge in the charge conveyor. The time must be less than one minute, and preferably should be about 10 to about 30 seconds.

The temperature in the decomposition zone can be as low as about 500° F. or as high as about 1200° F., but preferably is about 700° to about 800° F. The pressure is not critical and can vary from about atmospheric to about 4 inches water vacuum, a pressure of about one-half inch of water vacuum having been found very satisfactory. Residence time of the sludge in the decomposition zone will depend upon many variables, of course, such as the quality of the sludge being treated, the temperature in the decomposition zone, etc., but in general a period of about 2 to about 10 minutes has been found to be sufficient.

Figure 2:
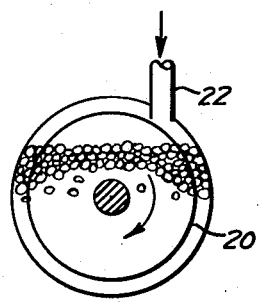

The process of this invention can be illustrated by reference to the accompanying drawing which is hereby incorporated in and made a part of the present specification. In Figure 1 there is illustrated a somewhat diagrammatic view in elevation of a decomposer, partially in section, which can be employed in the process of this invention. Figure 2 is a view taken along the line II—II in Figure 1.

Finished coke 2 leaves decomposer 4 by way of conduit 6 and is moved in any convenient manner, as by screw conveyors 8 and 10 into a hopper 12 having two sections 14 and 16. That portion falling into section 14 constitutes the net make of coke and is withdrawn from the system through outlet 18, while that portion falling into section 16 is picked up by screw conveyor, or other similar conveying means, 20 and returned to decomposer 14.

Prior to its entry into the decomposer, the coke is coated with sulfuric acid sludge entering the system by way of line 22. As shown in Figure 2, in order to prevent the acid sludge from splashing within the chamber, the discharge end of line 22 is positioned as near as possible to the surface level of the coke moving therein and is offset from the longitudinal axis of conveyor 20 so that the coated coke particles in moving through the conveyor to the entrance end of decomposer 4 are initially moved under the conveyor rather than over the same. As previously noted, in order to prevent coke balls from forming in the conveyor, the coated coke is introduced into the decomposer in less than one minute. Sludge inlet 22 is therefore positioned adjacent the exit end of conveyor 20 so that, taking into consideration variables such as the design of conveyor 20, its rotational speed, the amount of coke moved, etc., the time elapse between the coating of the coke with sludge and the entry of the coated coke into the decomposer is within the time limits hereinbefore defined.

The coke particles coated with sulfuric acid sludge fall into decomposer 4 onto the upper floor 24 and are moved toward the center thereof by rabble arms 26 fixedly mounted on rotating shaft 28 rotating as shown in the direction of the arrow encircling it. As the coated coke moves toward the center it drops onto the lower floor 30 wherein rabble arms 32, also fixedly attached to shaft 28, move the coated particles outwardly toward conduit 6 for removal from the decomposer. By the time the coated particles have moved toward the perimeter of lower floor 30 and are ready to drop into conduit 6, the sludge introduced in the decomposer has decomposed to form additional carbonaceous material and gaseous products such as sulfur dioxide, hydrocarbon vapors, carbon dioxide and nitrogen. Heat for the decomposition is supplied to the decomposer 4 by the hot recycled coke and by burners 34 employing natural gas or the like mounted in indirect heat exchange relationship with respect to the sludge within the decomposition zone itself. Exhaust gases from the burners are removed by line 36, while the decomposition gases are removed by line 38 for further processing.

The process of this invention can further be illustrated by the following example. Over a twenty-four hour period, 18,000 pounds of coke (net make) having an average diameter of ⅛ to ¼ inch and a temperature of 436° F. were removed from the decomposition zone. The coke was recycled at the rate of about 23 cubic feet per minute (about 840 tons per day). Before the recycle coke was introduced into the decomposition zone, it was contacted and coated with 84,000 pounds of sulfuric acid sludge analyzing as follows: 64 percent by weight of sulfuric acid, 10 percent by weight of water and 26 percent by weight carbon. The recycled coke was coated with sludge in the manner shown in the drawing. The coated coke was introduced into the decomposition zone 15 seconds after coating with sulfuric acid sludge occurred. The temperature in the decomposition zone was maintained at 790° F., the pressure —1 inch of water and the residence time 6 minutes. The decomposition gases analyzed as follows: 72.4 percent by volume sulfur dioxide, 12.4 percent by volume hydrocarbons, 35 percent by volume carbon dioxide, 2.5 percent by volume carbon monoxide and 9.2 percent by volume nitrogen. No clogging of the charge screw conveyor or decomposition zone occurred over this period of time.

Obviously, many modifications and variations of the invention, as hereinabove set forth, can be made without departing from the spirit and scope thereof, and therefore only such limitations should be imposed as are indicated in the appended claims.

I claim:

1. Method for recovering acid values from sulfuric acid sludge which comprises coating hot coked material while the same is moving in a generally helical path with sulfuric acid sludge, passing said coated hot coked material along a generally helical path to a decomposition zone in less than about one minute, maintaining the temperature in said decomposition zone sufficiently high to substantially coke the major portion of the hydrocarbon material in said sludge and obtain gaseous decomposition products, removing said gaseous decomposition products from said decomposition zone, removing coked material from said decomposition zone, and recycling a portion of said latter coked material to constitute the hot coked material coated with the sulfuric acid sludge.

2. Method for recovering acid values from sulfuric acid sludge which comprises coating hot coked material while the same is moving in a generally helical path with sulfuric acid sludge, passing said coated hot coked material along a generally helical path to a decomposition zone in less than about one minute, maintaining the temperature in said decomposition zone sufficiently high to substantially coke the major portion of the hydrocarbon material in said sludge and obtain gaseous decomposition products, removing said gaseous decomposition products from said decomposition zone, removing coked material from said decomposition zone having an average particle size less than about ⅜ inch in diameter, and recycling a portion of said latter coked material to constitute the hot coked material coated with the sulfuric acid sludge.

3. Method for recovering acid values from sulfuric acid sludge which comprises coating hot coked material while the same is moving in a generally helical path with sulfuric acid sludge, passing said coated hot coked material along a generally helical path to a decomposition zone in less than about one minute, maintaining the temperature in said decomposition zone sufficiently high to substantially coke the major portion of the hydrocarbon material in said sludge and obtain gaseous decomposition products, removing said gaseous decomposition products from said decomposition zone, removing coked material from said decomposition zone at a temperature of about 400° to about 500° F. and recycling a portion of said latter coked material to constitute the hot coked material coated with the sulfuric acid sludge.

4. Method for recovering acid values from sulfuric acid sludge which comprises coating hot coked material while the same is moving in a generally helical path with sulfuric acid sludge, passing said coated hot coked material along a generally helical path to a decomposition zone in less than about one minute, maintaining the temperature in said decomposition zone sufficiently high to substantially coke the major portion of the hydrocarbon material in said sludge and obtain gaseous decomposition products, removing said gaseous decomposition products from said decomposition zone, removing coked material from said decomposition zone, and recycling a portion of said latter coked material to constitute the hot coked material coated with the sulfuric sludge, the amount of recycled coked material being about 15 to 30 parts by weight per part of sulfuric acid sludge.

5. Method for recovering acid values from sulfuric acid sludge which comprises coating hot coked material while the same is moving in a generally helical path with sulfuric acid sludge, passing said coated hot coked material along a generally helical path to a decomposition zone in less than about one minute, maintaining the temperature in said decomposition zone sufficiently high to substantially coke the major portion of the hydrocarbon material in said sludge and obtain gaseous decomposition products, removing said gaseous decomposition products from said decomposition zone, removing coked material from said decomposition zone at a temperature of about 400° to about 500° F. having an average particle size less than about ⅜ inch in diameter, and recycling a portion of said latter coked material to constitute the hot coked material coated with the sulfuric acid sludge, the amount of recycled coke material being about 15 to about 30 parts by weight per part of sulfuric acid sludge.

6. Method for recovering acid values from sulfuric acid sludge which comprises coating hot coked material while the same is moving in a generally helical path with sulfuric acid sludge, passing said coated hot coked material along a generally helical path to a decomposition zone in less than about one minute, maintaining the temperature in said decomposition zone at about 500° to about 1200° F. to substantially coke the major portion of the hydrocarbon material in said sludge and obtain gaseous decomposition products, removing said gaseous decomposition products from said decomposition zone, removing coked material from said decomposition zone at a temperature of about 400° to about 500° F. having an average particle size less than about ⅜ inch in diameter, and recycling a portion of said latter coked material to constitute the hot coked material coated with the sulfuric acid sludge, the amount of recycled coked material being about 15 to about 30 parts by weight per part of sulfuric acid sludge.

7. Method for recovering acid values from sulfuric acid sludge which comprises coating hot coked material while the same is moving in a generally helical path with sulfuric acid sludge, passing said coated hot coked material along a generally helical path to a decomposition zone within about 10 to about 30 seconds, maintaining the temperature in said decomposition zone at about 700° to about 800° F. to substantially coke the major portion of the hydrocarbon material in said sludge and obtain gaseous decomposition products, removing said gaseous decomposition products from said decomposition zone, removing coked material from said decomposition zone at a temperature of about 420° to about 460° F. having an average particle size of about ¹⁄₁₆ to about ¼ inch diameter, and recycling a portion of said latter coked material to constitute the hot coked material coated with the sulfuric acid sludge, the amount of recycled coked material being about 20 to about 25 parts by weight per part of sulfuric acid sludge.

8. Method for recovering acid values from sulfuric acid sludge which comprises moving hot coked material towards a decomposition zone along a generally helical path, said helical path having a longitudinal component and a rotational component, directing sulfuric acid sludge into said helical path in the direction of said rotational component, immediately passing said hot coked material and said sulfuric acid sludge in contact therewith into said decomposition zone in less than about one minute, maintaining the temperature in said decomposition zone sufficiently high to substantially coke the major portion of the hydrocarbon material in said sludge and obtain gaseous decomposition products, removing said gaseous decomposition products from said decomposition zone, removing coked material from said decomposition zone, and recycling a portion of said latter coked material to constitute the hot coked material coated with the sulfuric acid sludge.

9. Method for recovering acid values from sulfuric acid sludge which comprises moving hot coked material towards a decomposition zone along a generally helical path, said helical path having a longitudinal component and a rotational component, directing sulfuric acid sludge into said helical path in the direction of said rotational component, immediately passing said hot coked material and said sulfuric acid sludge in contact therewith into said decomposition zone within about 10 to about 30 seconds, maintaining the temperature in said decomposition zone at about 700° to about 800° F. to substantially coke the major portion of the hydrocarbon material in said sludge and obtain gaseous decomposition products, removing said gaseous decomposition products from said decomposition zone, removing coked material from said decomposition zone at a temperature of about 420° to about 460° F. having an average particle size of about ¹⁄₁₆ to about ¼ inch diameter, and recycling a portion of said latter coked material to constitute the hot coked material coated with the sulfuric acid sludge, the amount of recycled coked material being about 20 to about 25 parts by weight per part of sulfuric acid sludge.

References Cited in the file of this patent

UNITED STATES PATENTS

| | | |
|---|---|---|
| 2,064,715 | Atwell | Dec. 15, 1936 |
| 2,074,061 | Mullen | Mar. 16, 1937 |
| 2,086,733 | Mullen | July 13, 1937 |
| 2,223,934 | Barnes et al. | Sept. 17, 1938 |
| 2,364,492 | Tuttle | Dec. 5, 1944 |
| 2,395,503 | Ross et al. | Feb. 26, 1946 |
| 2,571,107 | Breth | Oct. 16, 1951 |
| 2,703,749 | Herndon | Mar. 8, 1955 |

UNITED STATES PATENT OFFICE

CERTIFICATE OF CORRECTION

Patent No. 2,894,819                      July 14, 1959

Arthur E. Catanach

It is hereby certified that error appears in the above numbered patent requiring correction and that the said Letters Patent should read as corrected below.

In the grant, line 3, and in the heading to the printed specification, lines 5 and 6, State of incorporation, for "Delaware" read -- Pennsylvania --; column 2, line 34, for "the deposit" read -- and deposit --; column 3, line 55, for "14" read -- 4 --; column 5, line 36, for "sulfuric sludge" read -- sulfuric acid sludge --.

Signed and sealed this 10th day of November 1959.

(SEAL)
Attest:

KARL H. AXLINE                                        ROBERT C. WATSON
Attesting Officer                                   Commissioner of Patents